United States Patent Office 3,284,384
Patented Nov. 8, 1966

3,284,384
COATING COMPOSITIONS COMPRISING SILICON AND NITROGEN - CONTAINING POLYMERS AND OIL MODIFIED ALKYD RESINS
Konrad Parker, Park Ridge, Ill., assignor, by mesne assignments, to Dow Corning Corporation, Midland, Mich., a corporation of Michigan
No Drawing. Filed Aug. 2, 1963, Ser. No. 300,713
8 Claims. (Cl. 260—22)

This invention relates to new and improved coating compositions and, more particularly, to coating compositions comprising alkyd resins modified with silicon-nitrogen containing polymers or polymer-forming compounds. This application is a continuation-in-part of applicant's copending application Serial No. 6,099, filed February 2, 1960, now abandoned.

Protective and decorative coatings are made from a wide variety of organic materials or mixtures of organic and inorganic materials generally capable of forming a hard film, either as the result of prolonged exposure to air at ambient temperatures or by baking at elevated temperatures. A somewhat detailed disclosure of coating compositions may be found in the publication entitled, "Protective and Decorative Coatings," by Mattiello, volume I, published in 1941.

Drying oils, as the principal component for paints, varnishes and protective coatings, have been in use for a considerable period of time. Frequently, drying oils are modified with other components, such as phenolic resins, to obtain coatings having predeterminable properties. In my copending application, Serial No. 821,716, filed June 22, 1959, now abandoned, I have disclosed and claimed compositions of the foregoing type modified with silicon-containing resin or resin-forming materials. The present invention is concerned with modifying alkyd resin-type coating compositions with silicon-containing polymers or polymer-forming materials to obtain new coating compositions having enhanced chemical and weather resistance.

In general, the term "alkyd" is used to designate a class of resinous polyesters obtained by the condensation of polyhydric alcohols with polybasic acids or their anhydries. Certain types of alkyd resins generally are not considered suitable for forming polymeric compositions capable of being converted into hard films for use as protective or decorative coatings. For example, the reaction product of a dihydric alcohol and a dibasic acid or acid anhydride is normally incapable of undergoing cross-linking to the degree required to yield a hardened product. However, if an alcohol having more than two hydroxyl groups is reacted with a polybasic acid, branch chains can be formed between linear polyester chains thereby obtaining the desired cross-linking. In some instances, however, the cross-linking characteristics of a dihydric alcohol-dibasic polyester may be considerably improved if one of the reactants contains a functional group or position in addition to the hydroxyl or carboxylic groups. Thus, polyesters formed from maleic anhydride have such a characteristic due to the presence of the active unsaturated double bond of the maleic acid.

As indicated, where one of the ester-forming components contains a functionality of more than two, for example, three hydroxyl groups, the polyester alkyd resin can usually be converted to a highly cross-linked, insoluble, infusible state by heat. A typical polyester which may be cured in this manner is that formed from glycerol and phthalic anhydride. Other polyhydric alcohols which form polyesters with phthalic anhydride or similar polybasic acids or anhydrides are pentaerythritol, sorbitol and mannitol.

For many coating applications, it has been found desirable to modify alkyd resins with oxidizable unsaturated fatty acids of a drying or semi-drying oil, the modified composition being converted to an insoluble, infusible state by reaction with an active agent, such as oxygen. Oxidizable unsaturated fatty acid drying or semi-drying oils are exemplified by linseed, soybean, safflower, perilla, fish, tung, cottonseed and deydrated castor oil or similar vegetable oils and tall oil or fractionated tall oil. If the fatty acid itself is employed, it will readily react with an hydroxyl group of a polyhydric reactant, for example, glycerol. However, if desired, the fatty acid oil, usually a triglyceride, may be initially reacted with the polyhydric component, prior to making the alkyd polyester, to form fatty acid monoesters with the fatty acid portion of the oils, for example, monoglycerides. This well-known process is sometimes referred to as "transesterification."

For other selected applications, alkyds have been modified with partially unsaturated or completely saturated fatty acids to obtain built-in properties for a particular application. Examples of the latter type of fatty acid are coconut, castor and palm oil fatty acids. Alkyds modified with such acids are often used as plasticizers for lacquers or in combination with melamine and urea resins.

Properties of alykds may vary with oil content. For example, short oil alkyds (containing less than 35 percent oil by weight) are primarily used in baking finishes. Medium oil alkyds (35–55%) are especially suitable as coatings for metallic surfaces. Long oil alkyds, wherein the amount of oil is above 55 percent of the total weight, are frequently employed for architectural enamels. Some commercially available alkyds and their properties are disclosed in the brochure entitled, "Duraplex and Amberlac—Alkyd-Type Resins for Coatings," copyright 1958.

The silicon-containing polymers or polymer-forming compounds contemplated by the present invention as modifiers of alkyds or their fatty acid derivatives are those which are derived from the reaction of ammonia or primary amines with a halosilane wherein silicon-nitrogen units are formed. Halosilanes are considered to be silicon halides normally having hydrogen or one or more organic groups and one or more halogen atoms attached directly to silicon. However, silicon tetrachloride may be included within this term. Such halosilanes have the generic formula: $R_nSiHal_{4-n}$ wherein R is hydrogen or a monovalent organic group attached to the silicon, for example, alkyl, aryl, vinyl, and similar hydrocarbon or other groups and $n$ may be an integer from 0–3. The symbol "Hal," of course, stands for a halogen atom. Processes for making this type of compound and many of the compounds themselves are disclosed in several patents issued to Nicholas D. Cheronis, examples of which are U.S. Patents 2,579,417 and 2,579,418.

As indicated in the Cheronis patents, the reaction of a halosilane, having the above generic formula, with ammonia or a primary amine results in the substitution of an $NH_2$ or NHR amino group for each of the halogen atoms attached to the silicon and the formation of $NH_4Cl$ as a by-product. The reaction is conducted in the absence of water in order to avoid hydrolysis and frequently in the presence of an inert organic solvent. In many instances, it has been found that, simultaneously or immediately subsequent to the ammonolysis or aminolysis of the halosilanes, additional reactions will occur wherein many of the resultant ammonolysis or aminolysis reaction products undergo polymerization, forming linear or cyclic polymeric compositions or a combination of the two. In many instances, it is difficult, if not impossible, to isolate the monomeric form of the ammonolysis or aminolysis reaction products. As indicated, various primary amines, in addition to ammonia, may be employed; however, the ammonia and lower alkyl amines, such as methyl and ethyl amines, are preferable. The polymeric form of the reaction products has a relatively complex structure depending upon the type of halosilane employed. Suggested structures are disclosed in the above mentioned Cheronis patents, the polymeric silamines being generally considered to be characterized by a plurality of repeating silicon-nitrogen units.

In some instances, the ammonolysis or aminolysis reaction products of halosilanes are referred to as "aminosilanes" or "silamines," or more recently, with respect to polymeric reaction products, as "silazanes." The term "silamines" will, at times, be used herein in referring to the ammonolyzed or aminolyzed reaction products contemplated.

The halosilanes and their ammonolysis or aminolysis reaction products are also frequently described in terms of their functionality. Functionality is an indication of either the replaceable halogen atoms attached directly to the silicon or the amino groups which have replaced such halogen atoms. Thus, a halosilane having two replaceable halogen atoms attached directly to the silicon would be referred to as being difunctional as would the corresponding ammonolysis or aminolysis reaction products. Likewise, a halosilane having three or four replaceable halogen atoms attached directly to the silicon, as well as the derivative ammonolysis or aminolysis reaction products, would be referred to as being trifunctional or tetrafunctional, respectively. It is possible to have only one replaceable halogen atom attached to the silicon atom, in which event the corresponding ammonolysis or aminolysis reaction product would be monofunctional. The polyfunctional reaction products are those which tend to or do polymerize upon formation.

The polymeric or polymer-forming silamines principally contemplated herein as modifiers for the alkyd or oil-modified alkyds are the ammonolysis or aminolysis reaction products of the polyfunctional halosilanes and, as indicated above, are further characterized by having an Si–N–Si linkage as part of their molecular structure. Thus, the preferred silamines are those derived from halosilanes having the foregoing formula wherein $n$ is an integer from 0–2, and R is preferably a monovalent aliphatic or aromatic hydrocarbon group, examples of which are methyl, ethyl, vinyl, phenyl, and similar alkyl, unsaturated alkyl, aryl and substituted aryl groups. In many instances, it may be desirable to employ a hybrid silamine obtained by the ammonolysis or aminolysis of a mixture of halosilanes, for example, a mixture comprising dimethyldichlorosilane and methyltrichlorosilane or methyltrichlorosilane and diphenyldichlorosilane. In such a mixture it is obviously possible for $n$ in the formula $R_nSiHal_{4-n}$ to have fractional average values. As shown by the examples below, it is preferred that $n$ has an average value of from about 1 to about 2.2.

It is contemplated that various combinations of the aforementioned silamines and alkyds or oil-modified alkyds can be selected, the prime considerations being properties required and economics involved. However, as in all analogous systems, certain components are inclined to be more compatible than other components and certain types of one component, when modified with selected complementary components, will provide compositions having enhanced advantages as compared to other combinations of the system.

In general, the longer drying oil alkyds, containing a minimum of about sixty percent by weight of fatty acid, were found to be the most compatible with silamines. However, as the oil content of an alkyd decreases, the alkyd becomes more reactive due, at least in part, to residual hydroxy and carboxyl groups. Reactions of the alkyd and silamine are considered to occur between the nitrogen groups of the silamine and available reactive groups of the alkyd, particularly carboxylic acid and hydroxyl groups. Of the silamines, the aryl or arylalkyl silamines, having one or two phenyl groups attached to a silicon atom, are to be preferred, as compared to silamines having only alkyl groups, for example, methyl and ethyl, due to the higher equivalent weight, reduced reactivity and generally improved coating properties of the former type silamines. Special properties have also been obtained when a vinyl silamine is employed as a modifier, particularly in connection with improvement in water resistance. This silamine obtained by ammonolyzing, for example, an equimolar mixture of vinyl trichlorosilane and dimethyldichlorosilane, has offered advantages in this respect.

Two species of silamines may sometimes be prepared from substantially the same starting components by careful control of processing conditions. For example, if a diphenyldihalosilane is ammonolyzed at a temperature much above room temperature, a solid polymeric material is frequently obtained, generally melting at a temperature in the vicinity of 160° C. If the same ammonolysis is conducted at a temperature somewhat below 0° C., for example, in the range of −30 to −60° C., the resulting product is liquid. There appears to be some difference in the chemical structure of these two difunctional silamines, depending on the process employed in their formation. Thus, the difunctional silamines formed at elevated temperatures appear to have, primarily, a cyclic structure, whereas the corresponding difunctional silamines formed at reduced temperatures below 0° C. appear to have a predominantly linear structure. The linear type are preferred as modifiers for alkyds and, particularly, those containing phenyl groups, such as the diphenyl or methylphenyl silamines, in that these silamines, in addition to the enhanced properties provided, also enable the formation of a "one package" composition having a reasonable or commercially attractive "shelf life." Such compositions, when used for coatings, may be applied by brushing, rolling, dipping or spraying, the formulation being variable as to viscosity, solids-content, and solvent, to meet application requirements.

In those instances wherein the alkyd-silamine composition has a short shelf life, for example, fast reaction at room temperature, the components may be mixed just prior to use or, for certain applications, be simultaneously sprayed on a desired surface by a two-nozzle spray gun.

Various modifying components may be added to the alkyd-silamine composition to obtain required properties. Driers, of the type disclosed in my copending application, Serial No. 767,291, filed October 5, 1958, now U.S. Patent 3,007,886, comprising, in the main, metallic salts of fatty acids, may be added when necessary, as may various pigments, dyes and fillers to produce paints, enamels and industrial finishes. Further, other resins, such as urea and melamine aldehyde condensation products, can be employed, as well as plasticizers, for example, dioctyl phthalate, to provide desired properties in coatings. Typical solvents for use in making coating compositions are the aromatic or aliphatic hydrocarbons derived from petroleum or coal-tar, such as benzene, xylene and hexane.

Among improvements noted in alkyd coatings modified with various silamines are flexibility, impact resistance and color retention. Additionally, alkali and boiling water resistance are also improved, particularly after heat aging.

The silamines offer advantages as modifiers for alkyd polyesters as compared to the broadly analogous siloxanes, which have also been proposed for use as modifiers. Thus, many of the siloxanes are incompatible with alkyd compositions and, hence, cannot be mixed with such compositions. If it is desired to incorporate siloxanes into an alkyd-type composition, it is frequently necessary to mix the siloxane with the basic components of the alkyd in an unreacted state for example with the initial alcohol and acid components as unreacted compounds followed by subjecting the mixture to heat to obtain an inter-reaction of all components. These disadvantages are not characteristic generally of the silamines. Thus the vast majority of silamines have been found to be readily compatible with most alkyd compositions and capable of being mixed therewith at ordinary or ambient temperatures.

A typical silamine and process for preparing the same is illustrated in the following example:

Example 1

2400 grams (330 ml.) of liquid ammonia were charged into a reaction flask surrounded by a cooling bath of Dry Ice, the flask being filled with a Dewar-type condenser likewise filled with Dry Ice to reflux liquid ammonia. When the internal temperature reached —56° C., 1280 grams (5.05 moles) of diphenyldichlorosilane dissolved in 5430 ml. of hexane were introduced into the reaction flask over a period of 201 minutes. Maximum temperature obtained during the reaction was —47° C., the final temperature being —620° C. The cooling bath was removed and reaction mixture was permitted to warm up to room temperature, excess ammonia escaping through a mercury bubbler. When the internal temperature reached about 20° C., the mixture was filtered by drawing the slurry through a one inch diameter glass and rubber tube into a 4″ x 24″ Pyrex glass column filter using vacuum. A stream of nitrogen was introduced into the reaction flask to create a slight pressure, thereby excluding moist air from the system. The original Skellysolve-B filtrate weighed 3957 grams and contained 21.3 wt. percent solids or 842.8 grams of product. The precipitated ammonium chloride was washed twice in the Pyrex column filter with methylene chloride. The first wash solution weighed 2056 grams and contained 7 wt. percent solids for an additional 143.9 grams of silamine. The second wash solution weighed 2390 grams and contained only 0.895 wt. percent solids or only 21.4 grams. The total recovered silamine was 1008 grams for a one hundred percent yield, based on theory. The silamine obtained by evaporation of the hexane from the mother liquor was a liquid at room temperature; that obtained similarly by evaporating the methylene chloride from the first wash was a viscous liquid at room temperature; and finally, that obtained from the second wash solution was a solid at room temperature. The liquid product obtained from the mother liquor was analyzed as follows:

| | Weight percent |
|---|---|
| C | 66.89 |
| H | 5.92 |
| N | 9.47 |
| Si | 13.00 |
| Cl | 0.08 |

Similar procedures were used to prepare the silamines of the following examples. In these examples there is illustrated the preferred proportions of alkyd resin to silicon-containing polymer, ranging from 1 to 12 parts by weight of the alkyd resin per part of the silamine polymer.

Example 2

A 50% xylene solution of equal parts of Rezyl 873–1, a soya-modified alkyd resin containing 23% phthalic anhydride, constituting the alkyd resin solution and the ammonolysis product of diphenyldichlorosilane as prepared in Example 1 was applied to a tin panel and baked twenty-four hours at 200° C. An unmodified alkyd coating was, likewise, applied to a tin panel. The coating containing the silamine was much lighter in color and did not fail when the panel was bent over a ¼″ diameter mandrel or subjected to a 30 inch-pound impact. The unmodified alkyd coating failed both of these tests.

Example 3

A 50% solution in xylene was made by cold blending 50 parts of the alkyd resin of Example 2 and 50 parts of the ammonolysis product of 1 mole of phenyltrichlorosilane and 4 moles of diphenyldichlorosilane, prepared by using the procedure of Example 1. The modified, as well as the unmodified, alkyd compositions were used to coat separate tin panels. After baking three hours at 200° C., the silamine-containing coating possessed better resistance to 5% hydrochloric acid and 5% sodium hydroxide than the unmodified coating. After a twenty-four hour bake at 200° C., the silamine-containing coating was lighter in color and passed the ¼″ diameter mandrel and 30 inch-pound impact tests of Example 2, which the unmodified alkyd coating failed. The volatility or weight loss of the alkyd-silamine resin solids was determined to be 7.9% as compared to 8.8% for the alkyd resin solids after a four hour heat treatmentat 250° C. This 10% reduction indicates the improved heat stability of the alkyd after addition of the silamine.

Example 4

A 50% xylene solution of the alkyd resin of Example 2 was mixed cold with a 50% xylene solution of the ammonolysis product of 4 moles of diphenyldichlorosilane, 4 moles of dimethyldichlorosilane, 1 mole of triphenylchlorosilane and 1 mole of trimethylchlorosilane, prepared using the general procedure of Example 1. After a three hour bake at 200° C., a tin panel coated with the silamine-modified alkyd was more resistant to 5% sodium hydroxide and 5% hydrochloric acid than the same unmodified alkyd coating similarly prepared. After twenty-four hours at 200° C. baking, a tin panel coated with the alkyd-silamine composition passed the ¼″ mandrel and 30 inch-pound impact tests, which the unmodified alkyd coating failed.

Example 5

Seventy-five parts of the alkyd solution of Example 2 were mixed with 25 parts of the ammonolysis product of equal molar ratios of phenyltrichlorosilane and diphenyldichlorosilane. The silamine-modified alkyd solution air-dried on glass in thirty minutes to a clear, smooth film, while the unmodified alkyd film was not yet tack-free after one week. The former was found to have a volatility or weight loss of 5.0% as compared to 8.8% for the latter when heated to 250° C. for four hours. After three hours' baking, the silamine-containing coating was much lighter in color and had excellent resistance to 5% sodium hydroxide as compared to the unmodified alkyd coating.

Example 6

A 50% toluene solution of the ammonolysis product of phenyltrichlorosilane was mixed in the ratio of 1 to 4 with the alkyd resin solution of Example 2. After one hour bake at 200° C., a coating applied to a tin panel had attained a pencil hardness of B, as compared to only 6B for the unmodified alkyd coating.

Example 7

Seventy-five parts of Rezyl 412–1, a 50% resin solution of a medium soya-modified alkyd resin containing 30% phthalic anhydride, were mixed with 25 parts of the ammonolysis product of Example 1. Coatings were prepared on tin panels from the silamine-modified alkyd solution, as well as the unmodified alkyd by baking at 200° C. After three hours, the former had retained better color and resisted 5% sodium hydroxide, while the latter was dark brown in color and was disintegrated by the alkali. After twenty-four hours' bake, the silamine-modified alkyd passed the 30 inch-pound impact test, while the unmodified alkyd flaked off in this test. After addition of 0.06% cobalt, as 6% cobalt octoate (based on the calculated oil content of the varnish), the modified alkyd air-dried in five to six hours as compared to thirty hours required by the unmodified alkyd also containing cobalt.

Example 8

To Duraplex A–29, a 60% soya-modified alkyd resin solution containing 39% phthalic anhydride, was added 5% by weight of the ammonolysis product of Example 1. Coatings of the modified and unmodified A–29–50% solvent solutions were applied to tin panels and baked one hour at 200° C. The modified coating was not discolored or softened in five hours' immersion in boiling water, while the unmodified coating was visibly affected.

Example 9

One hundred parts of Duraplex D–65A, a 70% solution of a soya-alkyd resin containing 32% phthalic anhydride, were mixed with 17.5 parts of the ammonolysis product of silicon tetrachloride and diphenyldichlorosilane. Films of the modified and unmodified alkyd solution were applied to tin panels, baked for one hour at 200° C. and immersed in boiling water for three hours. The modified alkyd coating was not affected, while the unmodified coating had whitened or blushed, and was also softened. After twenty-four hours' bake at 200° C., the modified alkyd coating was only slightly affected by twenty hour immersion in 10% sodium hydroxide solution, while the unmodified alkyd coating had lost all adhesion to the metal substrate.

Example 10

To 100 parts of Duraplex C–57, a 60% soya-alkyd resin solution containing 32% phthalic anhydride, was added 15 parts by weight of the ammonolysis product of equal moles of methyltrichlorosilane and diphenyldichlorosilane. The mixture was reduced to 50% solids with xylene and applied to tin panels. After one hour bake at 200° C., the coated panel was unaffected by three hour immersion in boiling water, while an unmodified C–57 coating, similarly prepared, blushed and softened.

Example 11

The alkyd resin of Example 10 was modified with the ammonolysis product of equal moles of phenyltrichlorosilane and diphenyldichlorosilane. The amounts added and coating preparation was the same as described in the previous example. The resulting silamine-containing coating had excellent resistance when subjected to a three hour test in boiling water as compared to the control which was found to have lower resistance and which was also softer in pencil hardness.

Example 12

To 100 parts of Duraplex C–57, described in previous examples, was added 15 parts of a silamine obtained by the ammonolysis or equal molar parts of tetrachlorosilane and diphenyldichlorosilane. The unmodified Duraplex C–57 was used as a control. Both vehicles were reduced with xylene to 50% solids and flow-coated on tin plate panels and baked one hour at 200° C. The silamine-modified coating was found to have better hardness and boiling water resistance than the unmodified alkyd coating. It also has a B pencil hardness vs. 2B for the control, and it was unaffected by five hours in boiling water, the control coating failing in three hours.

Example 13

To 100 parts of Duraplex ND–78, a short oil, non-oxidizing phthalic alkyd resin containing 43% phthalic anhydride and 33% coconut oil at 60% solids in xylene, was added 15 parts of a silamine, obtained by the ammonolysis of equal molar parts of diphenyldichlorosilane and vinyltrichlorosilane. The unmodified Duraplex ND–78 was used for the control. Both vehicles were reduced with xylene to 50% solids, flow-coated on tin plate panels, and baked for one and three hours at 200° C. The one hour baked silamine-modified coating withstood a 30 inch-pound impact (either side of the panel), and was not affected by four hours in boiling water, while the control failed both tests. Further, the three hour baked silamine-modified coating was not affected by five hours in boiling water as compared to failure of the control coating.

Example 14

To 100 parts of Duraplex ND–76, a coconut fatty acid-type alkyd used in baking enamels, was added 15 parts of a silamine obtained by the ammonolysis of equal molar parts of diphenyldichlorosilane and vinyltrichlorosilane. The unmodified Duraplex ND–76 was used as the control. Both vehicles were reduced with xylene to 50% solids, flow-coated on tin plate panels and baked at 200° C. for one and three hours. The one hour baked silamine-modified coating had better impact and boiling water resistance than the unmodified control. Thus, the baked silamine-containing coating withstood a 30 inch-pound impact and it was not affected when subjected to boiling water for four hours, while the control failed in both of these tests. The three hour baked silamine-modified coating was, likewise, found to have better flexibility than the unmodified coating in that it could take a 180° metal to metal bend over a 1/8" diameter mandrel rod, whereas the control coating failed under this test. The silamine-alkyd coating also withstood five hours in boiling water, which the control coating failed.

That which is claimed is:

1. A coating composition capable of being cured to a hard, infusible state consisting essentially of (1) an unsaturated vegetable oil modified alkyd resin and (2) the polymeric product of an anhydrous reaction occurring at a temperature below 0 degrees C. between (a) a member of the class consisting of ammonia and an alkyl primary amine and (b) a silicon halide having the general formula $R_nSiHal_{4-n}$ wherein R is selected from the group consisting of hydrogen, alkyl, vinyl and aryl radicals and $n$ is 0–2, (a) being present in the reaction in an amount in excess of that required to replace all the halogen atoms to the silicon of (b), said polymeric reaction product being characterized by having a silicon-nitrogen-silicon linkage as part of its molecular structure and nitrogen-containing groups as the sole functional groups, there being from 1 to 12 parts by weight of said alkyd resin (1) per part of said polymeric reaction product (2).

2. A composition as described in claim 1 wherein the vegetable oil is a soya bean oil.

3. A composition as described in claim 2 wherein the silicon halide comprises a mixture of phenyltrichlorosilane and diphenyldichlorosilane.

4. A composition as described in claim 2 wherein the silicon halide comprises a mixture of vinyltrichlorosilane and dimethyldichlorosilane.

5. A coating composition capable of being cured to a hard, infusible state consisting essentially of (1) an alkyd resin modified with a minimum of about fifty-five percent by weight of an unsaturated vegetable oil comprising at least sixty percent by weight of a fatty acid and (2) the polymeric product of an anhydrous reaction occurring at a temperature below 0 degrees C. between ammonia and a silicon chloride having the general formula $R_nSiCl_{4-n}$ wherein R is selected from the group consisting of hydrogen, alkyl, vinyl, and aryl radicals, and $n$ is 0–2, (a) being present in the reaction in an amount in excess of that required to replace all the halogen atoms to the silicon of (b) said polymeric reaction product being characterized by having a silicon-nitrogen-silicon linkage as part of its molecular structure and nitrogen-containing groups as the sole functional groups, there being from 1 to 12 parts by weight of said alkyd resin (1) per part of said polymeric reaction product (2).

6. A composition as described in claim 5 wherein R is the phenyl radical.

7. A composition as described in claim 5 wherein said vegetable oil is a soya bean oil.

8. A coating composition capable of being cured to a hard, infusible state consisting essentially of (1) an unsaturated vegetable oil modified alkyd resin and (2) the polymeric product of an anhydrous reaction occurring at a temperature below 0 degrees C. between (a) a member of the class consisting of ammonia and an alkyl primary amine and (b) a silicon halide having the general formula $R_nSiCl_{4-n}$ wherein R is selected from the group consisting of hydrogen, alkyl, vinyl, and aryl radicals, and $n$ has an average value of from 1 to 2.2 inclusive, (a) being present in the reaction in an amount in excess of that required to replace all the halogen atoms to the silicon of (b) said polymeric reaction product being characterized by having a silicon-nitrogen-silicon linkage as part of its molecular structure and nitrogen-containing groups as the sole functional groups, there being from 1 to 12 parts by weight of said alkyd resin (1) per part of said polymeric reaction product (2).

References Cited by the Examiner
UNITED STATES PATENTS 2,579,418　12/1951　Cheronis _____ 260—18
2,635,059　4/1953　Cheronis _____ 260—46.5

OTHER REFERENCES

Chatfield, "Varnish Constituents" (1953), pp. 721–724.

LEON J. BERCOVITZ, *Primary Examiner.*

R. A. WHITE, *Assistant Examiner.*